(12) United States Patent
Lin

(10) Patent No.: US 6,798,656 B1
(45) Date of Patent: Sep. 28, 2004

(54) HARD DISC DRIVE HEAT SINK AND SOUND ABSORBING FRAME

(76) Inventor: Jen-Cheng Lin, 9 Fl., No. 786, Chung-Cheng Rd., Chung-Ho City, Taipei Hsien (TW)

( * ) Notice: Subject to any disclaimer, the term of this patent is extended or adjusted under 35 U.S.C. 154(b) by 73 days.

(21) Appl. No.: 10/378,125

(22) Filed: Mar. 3, 2003

(51) Int. Cl.$^7$ ................................................. H05K 7/20
(52) U.S. Cl. ........................ 361/690; 248/633; 248/638; 248/618; 360/97.02; 361/704; 361/703; 369/75.1
(58) Field of Search ................................ 248/633–638, 248/618; 360/97.02, 97.01, 98.01; 369/75.1–75.2, 76, 77.1–77.2, 78–82; 361/687–721

(56) References Cited

U.S. PATENT DOCUMENTS

| | | | | |
|---|---|---|---|---|
| 5,510,954 A | * | 4/1996 | Wyler | 361/685 |
| 5,927,386 A | * | 7/1999 | Lin | 165/80.3 |
| 6,005,768 A | * | 12/1999 | Jo | 361/685 |
| 6,154,360 A | * | 11/2000 | Kaczeus et al. | 361/685 |
| 6,243,262 B1 | * | 6/2001 | Koo et al. | 361/687 |
| 6,301,105 B2 | * | 10/2001 | Glorioso et al. | 361/685 |
| 6,324,054 B1 | * | 11/2001 | Chee et al. | 361/685 |
| 6,339,531 B1 | * | 1/2002 | McKain et al. | 361/685 |
| 6,339,532 B1 | * | 1/2002 | Boulay et al. | 361/685 |
| 6,377,455 B1 | * | 4/2002 | Nelik | 361/687 |
| 6,717,816 B1 | * | 4/2004 | Tanaka et al. | 361/728 |
| 2002/0051338 A1 | * | 5/2002 | Jiang et al. | |
| 2003/0193778 A1 | * | 10/2003 | Staiano | |

* cited by examiner

Primary Examiner—Gregory D. Thompson
(74) Attorney, Agent, or Firm—Jackson Walker LLP

(57) ABSTRACT

A hard disc drive (HDD) heat sink and sound absorbing frame comprises a sound absorbing frame, two heat sinks with multiple heat dissipating fins and two heat conducting seals. The sound absorbing frame has an open center and multiple through holes. Each heat sink has an inner surface, multiple screw holes, multiple posts with threaded holes attached to the inner surface of the heat sink and multiple heat dissipation fins. The HDD is securely mounted in the open center of the sound absorbing frame, and the heat sinks are mounted on the sound absorbing frame with the HDD. The multiple posts on the heat sinks respectively extend through the corresponding through holes in the sound absorbing frame. Screws screw into the threaded holes in the posts to hold the assembly together.

2 Claims, 6 Drawing Sheets

HARD DISC DRIVE HEAT SINK AND SOUND ABSORBING FRAME

BACKGROUND OF THE INVENTION

1. Field of the Invention

The present invention relates to a hard disc drive heat sink and sound absorbing frame, and the inventive device effectively removes heat and absorbs the sound generated by a computer hard disc drive.

2. Description of Related Art

With reference to FIGS. 5 and 6, a conventional computer hard disc drive (HDD) (30) is rectangular and comprises a body (not numbered) and a HDD housing. The body has a hard memory disc (not numbered) and a circuit board (not numbered). The body of HDD (30) comprises a top (not numbered), a bottom (not numbered). The HDD housing encloses the body and comprises a top cover (not numbered) and a bottom cover (34), and the bottom cover (34) has a rectangular recess (38) and multiple screw holes (36). The top cover is attached on the top of body of the HDD (30) to protect the memory disc. The bottom cover (34) is securely attached to the bottom of the body of the HDD (30) to protect the circuit board. The HDD (30) is securely mounted in a computer housing.

When power is supplied to the HDD (30), the disc in the top of the HDD (30) starts to rotate, and the disc rotation generates heat. Part of the heat is transferred to the HDD housing. Then the heat is radiated from the top cover of the HDD housing to the surrounding air so part of the heat is removed from the HDD housing. The rest of the heat dissipated is transferred to the bottom cover (34), and the bottom cover (34) radiates the heat into the surrounding air to release the heat. However, dissipating the hot air created by the HDD (30) to the surrounding cold air is a slow process. Furthermore, the temperature of the air surrounding the HDD (30) within the computer housing increases as time passes. Therefore, the longer the HDD (30) operates, the slower the heat dissipates. The disadvantage of the conventional HDD is that the heat dissipation from the top cover and the bottom cover (34) is not very efficiency because of the limited surface area. Moreover, the heat from the HDD (30) builds up in the air within the computer housing, and the temperature within the computer housing goes up. Furthermore, the heat in the air within the computer housing around the HDD (30) is hard to exchange with the cold air outside the computer housing.

To overcome the shortcomings, the present invention provide a sound absorbing frame device in combination with a heat sink assembly for a computer hard disc drive to mitigate the aforementioned problems.

SUMMARY OF THE INVENTION

The primary objective of the present invention is to provide an improved sound absorbing frame in combination with a heat sink assembly for a computer hard disc drive (HDD). The inventive device removes the heat very efficiently and absorbs the sound created from the HDD when power is supplied to the computer HDD.

To accomplish the foregoing objective, the inventive feature comprises mounting a sound absorbing frame and a heat sink assembly on the computer HDD.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
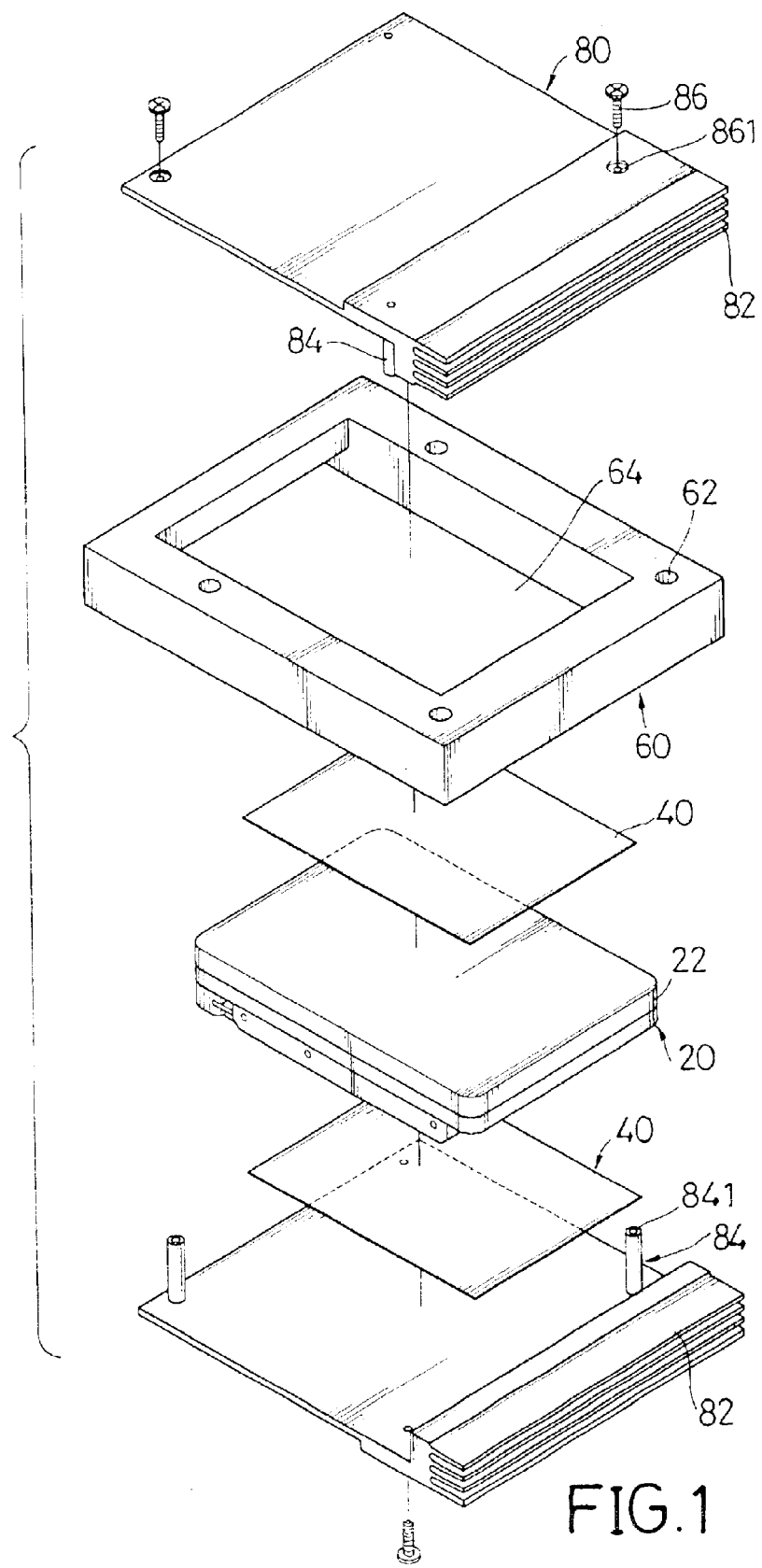
FIG. 1 is an exploded perspective view of a first embodiment of a hard disc drive heat sink and sound absorbing frame in accordance with the present invention.

With reference to FIG. 1, a first embodiment of a hard disc drive (HDD) heat sink and sound absorbing frame comprises a sound absorbing frame (60) and two heat sink assemblies (not numbered). The HDD (20) comprises a top (not numbered), a bottom (not shown) and a HDD top cover (22). The HDD top cover (22) is sealed to protect the HDD (20) from contamination such as dust and moisture.

The sound absorbing frame (60) is hollow and comprises an open center (64), two opposite sides (not numbered) and multiple thorough holes (62).

Each heat sink assembly comprises a heat conducting seal (40) and a heat sink (80) with an inner surface (not numbered), an outer surface (not numbered) and multiple heat dissipating fins (82). The heat sink (80) has three edges (not numbered) and one side (not numbered). The inner surface of the heat sink (80) has four corners (not numbered). Two posts (84) with inner threads (841) are securely mounted respectively near two opposite corners on the inner surface of each heat sink (80). A screw hole (861) is formed in each of the other two corners. Multiple heat dissipating fins (82) are integrally: formed on and extend out from the side of the heat sink (80).

Figure 2:
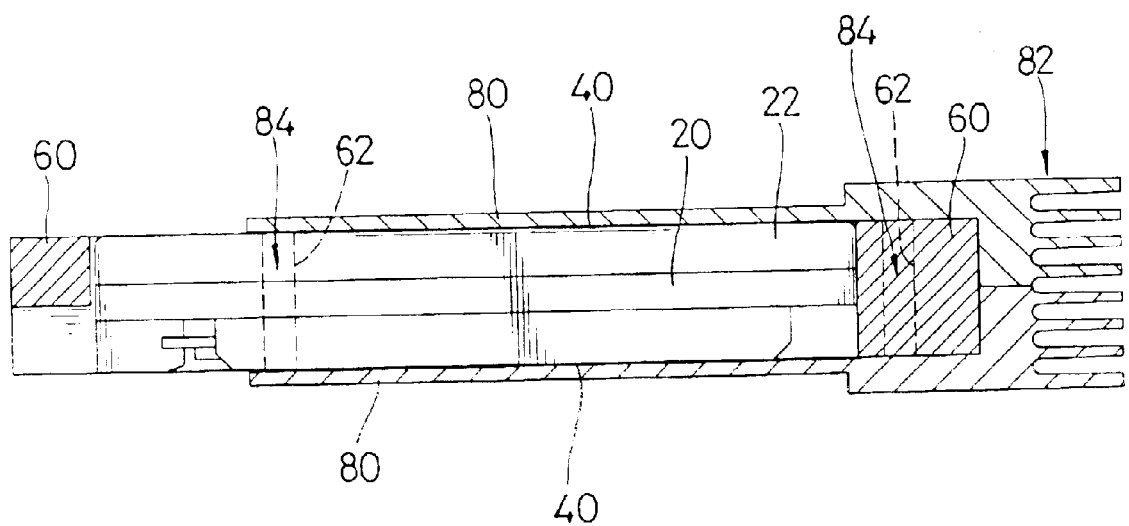
FIG. 2 is a side plan view in partial section of the hard disc drive heat sink and sound absorbing frame in FIG. 1.

With reference to FIG. 2, the hard drive (20) with the HDD top cover (22) is securely mounted in the open center (64) of the sound absorbing frame (60). Furthermore, the inner surfaces of two heat sinks (80) are securely attached to the HDD (20) with the sound absorbing frame (60). The posts (84) on the inner surface of one of the heat sink (80) respectively extends up and through corresponding holes (62) in the sound absorbing frame (60). The inner surface of the other heat sink (80) is securely mounted on the other side of the sound absorbing frame (60). The posts (84) on the inner surface respectively extend down and through the corresponding holes (62) in the sound absorbing frame (60). Then screws (86) respectively pass through the screw holes (861) in the heat sink (80) and are screwed into the inner threads (841) in the corresponding posts (84). The heat dissipating fins (82) on the two heat sinks (80) abut each other and extend in the same direction. Two heat conducting seals (40) are respectively mounted between the HDD (20) and the heat sinks (80). Therefore, the HDD heat sink and sound absorbing frame absorbs the sound and removes the heat generated by the HDD (20).

Figure 3:
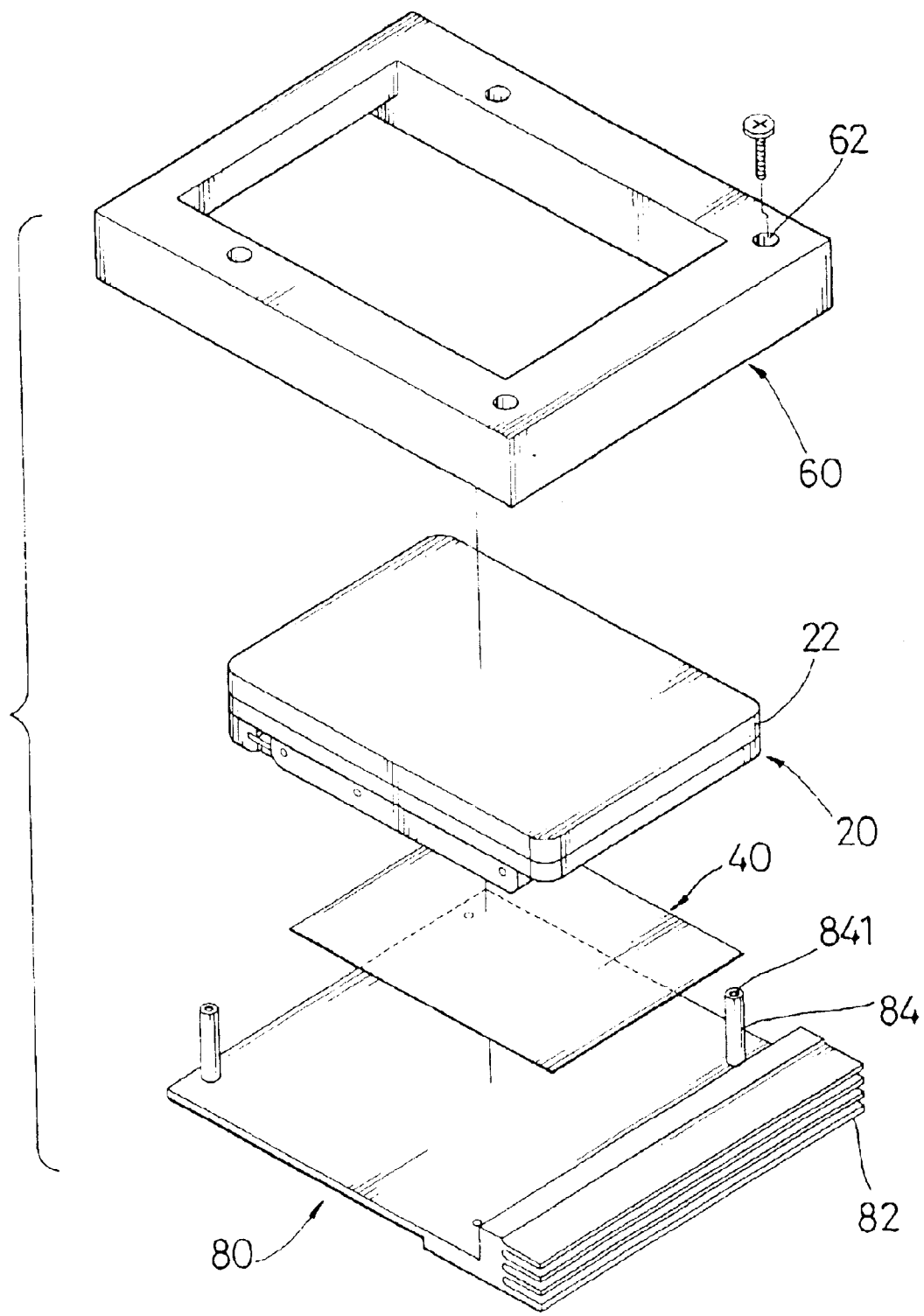
FIG. 3 is an exploded perspective view of a second embodiment of the hard disc drive heat sink and sound absorbing frame in accordance with the present invention.

With reference to FIG. 3, an exploded perspective view of a second embodiment of hard disc drive (HDD) beat sink and sound absorbing frame comprises one heat sink assembly instead of two heat sink assemblies like the first embodiment. Therefore, the second embodiment of the HDD heat sink and sound absorbing frame also absorbs sound and removes heat generated by the HDD (20).

Figure 4:
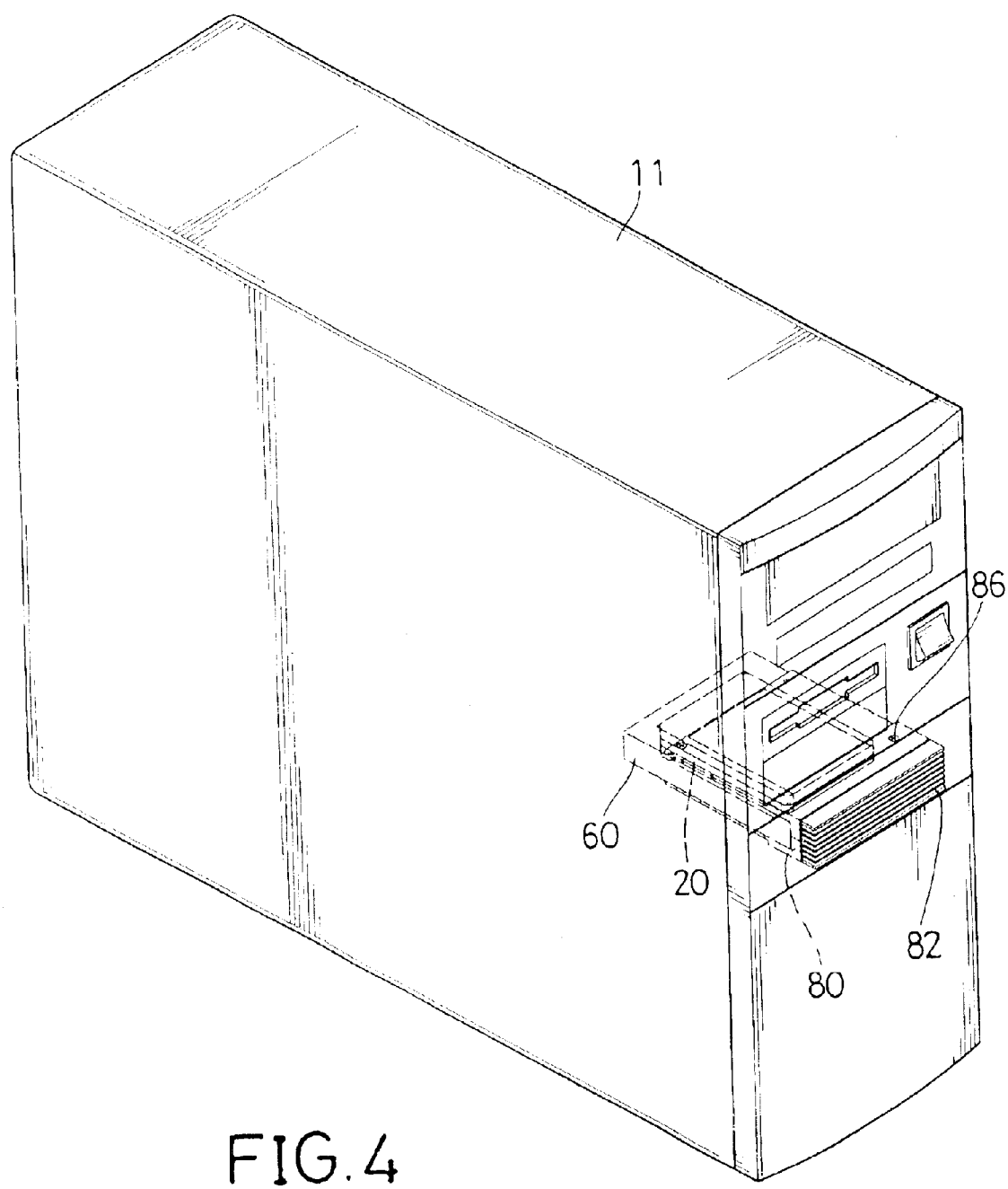
FIG. 4 is a perspective view of a hard disc drive heat sink with a sound absorbing frame in accordance with the present invention mounted inside a computer housing.
Figure 5:
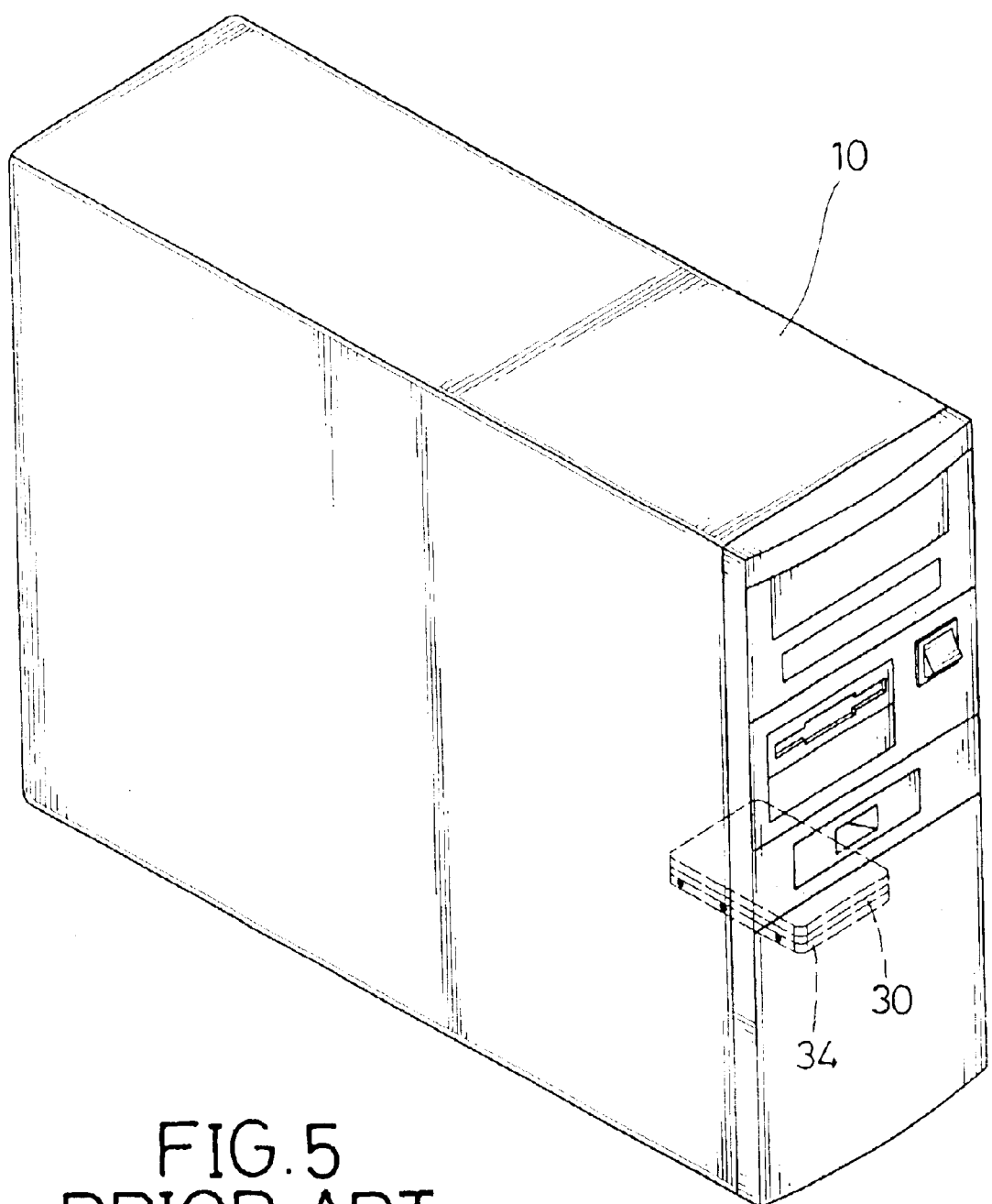
FIG. 5 is a perspective-view of a conventional hard disc drive heat sink in accordance with the prior art mounted inside a computer housing.
Figure 6:
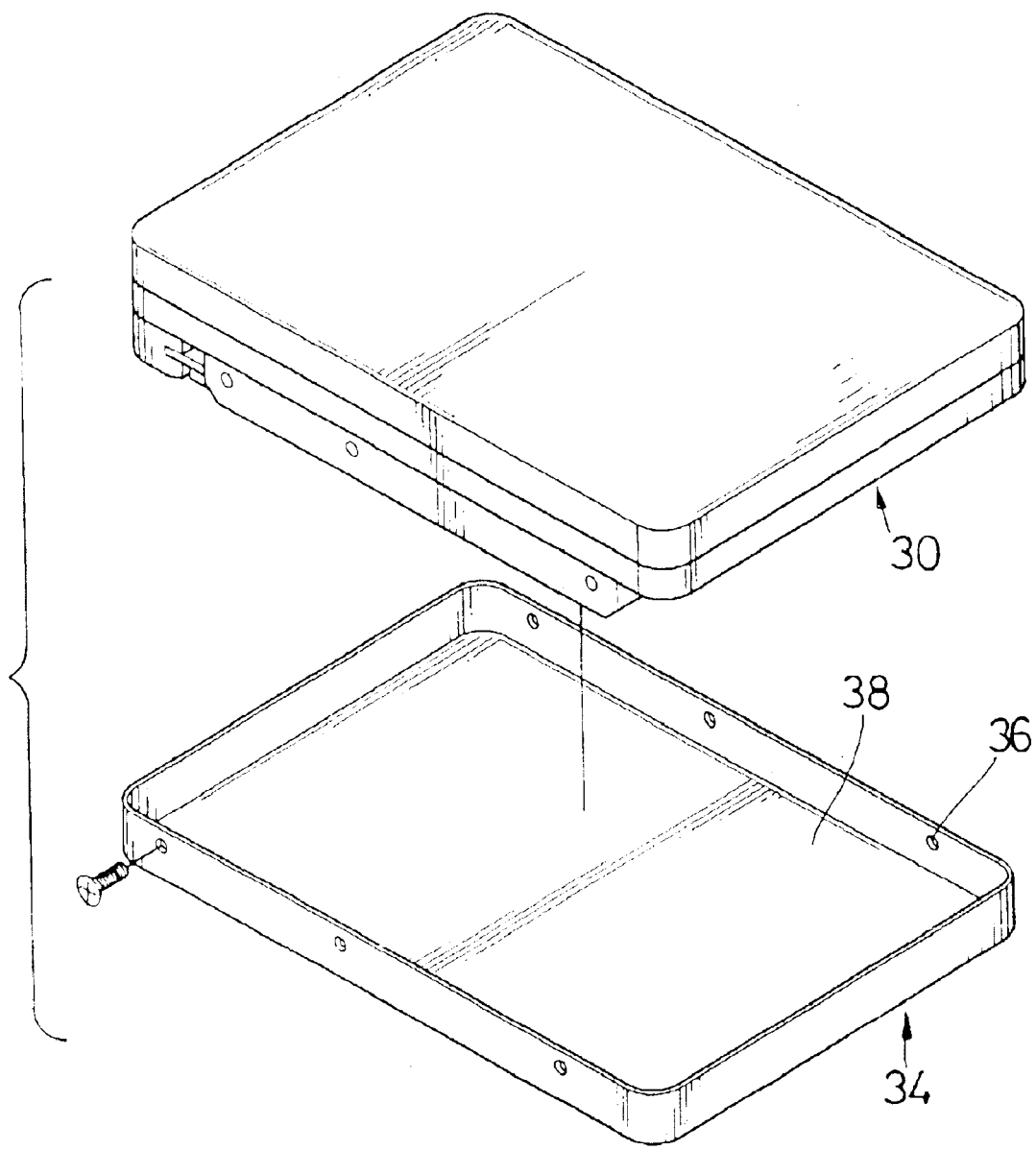
FIG. 6 is an exploded perspective view of the conventional hard disc drive heat sink in FIG. 4.

With reference to FIG. 4, the HDD heat sink and sound absorbing frame is mounted inside a computer housing (11) so the heat dissipating fins (82) protrude from the computer housing (11). Consequently, the heat removed from the HDD does not have to be removed from the inside of the computer housing (11).

The heat conducting seals (40) are mounted between the HDD (20) and the heat sinks (80) to enhance the heat conduction from the HDD (20) to the heat sinks (80). The advantage is that if the heat generated by the HDD (20) is removed quickly and efficiently, the heat is less likely to damage the HDD (20). Moreover, the sound absorbing frame (60) creates an environment, which absorbs part of the sound and blocks the sound from leaking out of the computer housing (11). In short, use of the HDD heat sink and sound absorbing frame creates a better working environment for people who use computers a great deal.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hard disc drive (HDD) heat sink and sound absorbing frame comprising;

a first heat sink assembly adapted for a hard disk drive (HDD) being mounted on the first heat sink assembly and comprising:

a heat sink comprising:

an inner surface and an outer surface, and the inner surface adapted for supporting the HDD;

three edges with a side formed on the heat sink; and multiple heat dissipating fins formed on the side of the heat sink;

a sound absorbing frame supported on the heat sink of the first heat sink assembly and having an open center where is adapted to be mounted around a hard disc drive; and a first heat conducting seal mounted between the heat sink of the first heat sink assembly and the sound absorbing frame to increase heat conduction between the heat sink and the sound absorbing frame.

2. The HDD heat sink and sound absorbing frame as claimed in claim 1, where the HDD further comprises a second heat sink assembly mounted on the sound absorbing frame to sandwich the sound absorbing frame between the first heat sink assembly and the second heat sink assembly, and the second heat sink assembly comprising:

a heat sink comprising:

an inner surface and an outer surface, and the inner surface adapted for supporting the HDD;

three edges with a side formed on the heat sink; and multiple heat dissipating fins formed on the side of the heat sink; and a second heat conducting seal mounted between the heat sink of the second heat sink assembly and the sound absorbing frame.

\* \* \* \* \*